United States Patent [19]

Mollod

[11] 3,731,210

[45] May 1, 1973

[54] REDUCTION OF TIMING RESOLUTION IN DIGITAL PHASE LOCK LOOPS

[75] Inventor: Leonard D. Mollod, New York, N.Y.

[73] Assignee: International Telephone and Telegraph Corporation, Nutley, N.J.

[22] Filed: May 4, 1972

[21] Appl. No.: 250,396

[52] U.S. Cl. ....................328/155, 307/262, 331/10

[51] Int. Cl. ....................H03b 3/00

[58] Field of Search ....................328/155; 331/10; 307/262

*Primary Examiner*—John Kominski

*Attorney*—C. Cornell Remsen, Jr. et al.

[57] ABSTRACT

This invention relates to a method of reducing the timing resolution necessary to obtain a given level of phase measurement accuracy from a digital phase lock loop in a digital sample data system such as is used in radio navigation systems; i.e. Loran. The phase lock loop tracks and measures the phase of a preselected cycle of the Loran pulse by repetitively sampling the incoming RF and modifying the phase number used to generate a sampling strobe pulse. If and when the strobe pulse does not straddle the zero crossing, a persistent phase error is detected, converted to digital form, smoothed to reduce noise, and then used to update all binary bits of a phase number integrator. The phase number integrator is used to measure the phase and control the strobe time event. The lower order bits of the phase number integrator, corresponding to the phase increments which are too fine to effect accurate control of the strobe timing, are converted to an equivalent phase error and fed back and subtracted from the output of said phase error detector to cancel any phase error arising from the insufficient timing resolution of the strobe pulse.

4 Claims, 7 Drawing Figures

REDUCTION OF TIMING RESOLUTION IN DIGITAL PHASE LOCK LOOPS

BACKGROUND OF THE INVENTION

This invention relates to a digital sample data system of the type used in radio navigation systems such as Loran, and more particularly to the reduction of timing resolution in the digital phase lock loops employed in such systems.

In a typical digital phase lock loop, of the type described in the IEEE Transactions on Aerospace and Electronic Systems, Vol. AES–2, No. 1, Jan. 1966, pages 74–88 entitled "Microminiature Loran C Receiver/Indicator," the resolution of the final phase integrator is made equal to, or greater than, the desired measurement accuracy. This has the disadvantage that the servo loop phase measurement will generally oscillate or hunt within a range of one least significant bit (LSB) of timing or phase resolution. As a result, a fluctuation error is generated which is proportional to the LSB of timing resolution.

Two techniques have been previously used to minimize the above described fluctuation error. The first is to simply employ high speed digital circuits and tapped delay lines to extend the timing accuracy. However, the use of high speed components results in increased cost.

The second technique is to cascade two phase lock loops, one in hardware with low resolution followed by another in computer software. The hardware implementation has a fast response and hunts quickly over the LSB timing range. The software loop following operates at a much slower rate to average the phase measurement to a steady value within the LSB range. In this case, a penalty is paid due to the additional complexity of the second loop in software, and due to the necessity of placing constraints on the loop time constants which could compromise noise or dynamic performance.

SUMMARY OF THE INVENTION

It is an object of the present invention to provide a method of reducing the timing resolution in digital phase lock loops which overcomes the hardware cost of the high speed timing approach and the compromises and costs of the cascaded loop approach. This allows full accuracy with the use of lower speed timing circuits such as MOS, and as such, will be useful when employing large scale integration (LSI) techniques or in low cost applications. Alternatively, measurement accuracy can be increased above that currently available by presently used approaches, to enable an extension to the state of the art in receiver design.

According to a broad aspect of the invention there is provided an improved method of reducing the timing resolution of a phase lock-loop of the type wherein the phase error of an input signal with respect to an internally generated strobe pulse is detected, smoothed and updates a phase number accumulator, and wherein the value contained in said phase number accumulator is compared to a timing counter driven by an internal clock to control the position of said internally generated strobe pulse, wherein the improvement comprises storing said accumulated phase error in a digital accumulator having n bits, comparing a predetermined number of higher order bits with the value contained in said timing counter to produce said strobe pulse for sampling said phase error, converting the value of the remaining lower order bits in said accumulator to an equivalent phase error and subtracting said equivalent phase error from the phase error of said input signal with respect to said strobe pulse to cancel any phase error component which is a result of insufficient resolution in said strobe pulse timing.

The above and other objects of the present invention will be more clearly understood from the following detailed description taken in conjunction with the accompanying drawings, in which:

DESCRIPTION OF THE PREFERRED EMBODIMENT

Loran is a hyperbolic line of position system by which a receiver can be located at the intersection of two hyperbolas. This is accomplished by measuring the difference in arrival times between two pairs of pulses emitted from three fixed transmitting sites. The transmitting stations are usually designated as Master, Slave X, and Slave Y.

Each station transmits precisely timed, pulsed RF signals. A pulse transmitted by the Master is received by Slave X which will synchronize itself to the Master and then transmit its own pulse at a fixed time later. Slave Y, also synchronized to the Master, will transmit a fixed time after it receives the Slave X signal, to avoid ambiguity.

Figure 1:
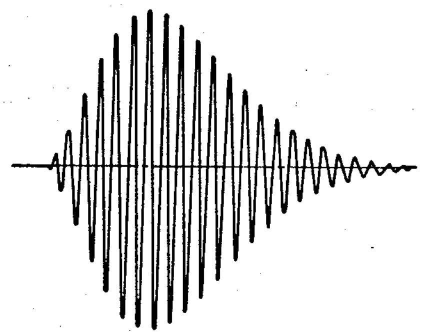
FIG. 1 is a curve representing a single Loran pulse.

Loran-C pulses are transmitted on a 100 KHz carrier, in groups of eight pulses, and with a group repetition rate ranging from 10 groups per second to 25 groups per second. The pulses in a group are spaced 1,000 microseconds apart. A single Loran-C pulse is illustrated in FIG. 1.

To establish a time base, the Master pulse repetition rate and carrier phase must be developed within the receiver. Referring to the phase lock loop shown in FIG. 2, a phase detector 1 compares the received pulse with an internally generated strobe pulse from a frequency divider 2. If a phase error is detected, the DC voltage produced is amplified and passed through integrator 3 with proportional gain. Integrator 3 controls a voltage controlled oscillator 4. Voltage controlled oscillator 4 provides a signal to frequency divider 2 which develops the strobe pulse at the proper Loran rate which is applied to the phase detector 1. The motion of the oscillator phase will reduce the error. The pulses so developed are then synchronized to the Master signal when the phase error is zero.

Figure 2:
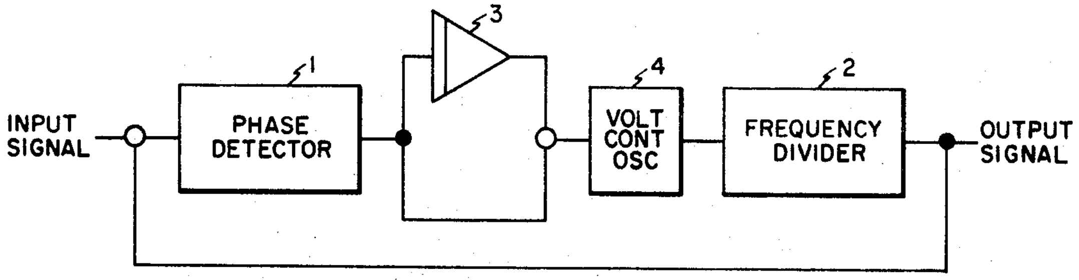
FIG. 2 is a functional block diagram of a Master phase lock loop.
Figure 3:
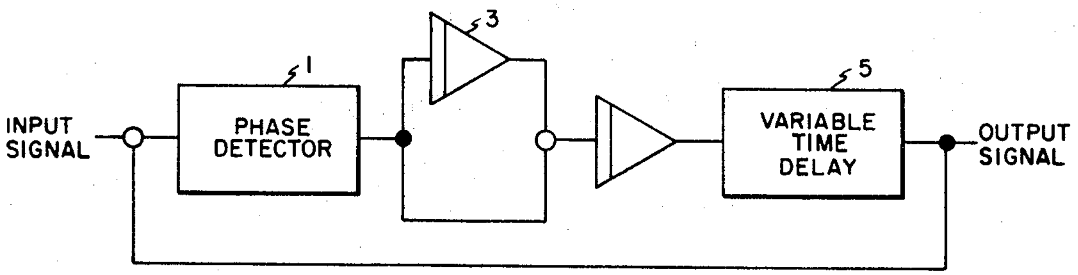
FIG. 3 is a functional block diagram of a Slave phase lock loop.

The Slave phase lock loop shown in FIG. 3 operates in a similar manner as does the Master phase lock loop shown in FIG. 2. However, a variable time delay circuit 5 rather than the oscillator-frequency divider of FIG. 2, develops the strobe pulses that are synchronized to the slave pulses. The measured time delay is the required output quantity, the Slave-to-Master time difference.

The implementation of the phase-lock loop requires the following functional elements: (1) integration, (2) scaling, (3) detection, (4) time delay generation, and (5) analog to digital conversion.

Analog integration has become quite common over the years, taking various well-known forms. The digital integrator can take at least two forms, serial and parallel. The serial integrator may simply be a reversable counter, whose state is the sum or accumulation of all previous input pulses. The parallel integrator consists of registers arranged to perform binary addition; the incremental sums are stored in the accumulator register.

Figure 4:
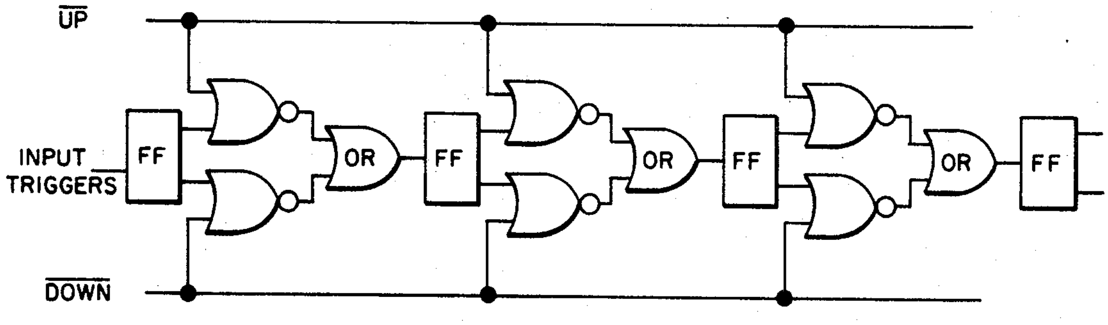
FIG. 4 is a logic diagram of a reversable digital counter.

If computing time is available, the serial integrator is more economical. Referring to FIG. 4, it can be seen that inserted between binary counting stages are "Exclusive OR" gates. Signals applied to the gates control the "UP" or "DOWN" modes of the counter. The "-DOWN" mode reverses the counter by adding to the complement of the stored count.

Figure 5:
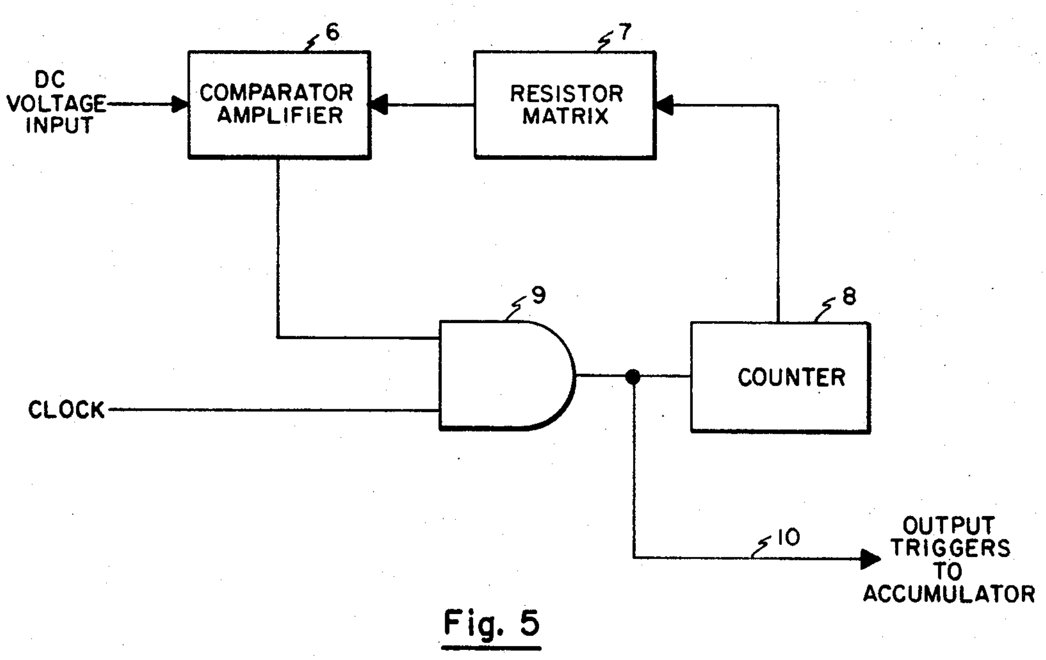
FIG. 5 is a block diagram of an analog-to-digital converter.

To integrate with respect to time, the counter is coupled to an analog-to-digital converter, one form of which is shown in FIG. 5. It consists of a digital-to-analog converter, a comparator, and gating logic. A voltage is presented to comparator 6. Also presented to comparator 6 is the output of digital-to-analog resistor matrix 7. The comparator controls clock pulses entering the counter 8 via gate 9 When the inputs to comparator 6 are of unequal voltage, the comparator gate 9 allows pulses to flow in two directions, out of the converter via line 10 and into counter 8, until the state of counter 8 reaches an equilibrium point. If counter 8 is cleared periodically at intervals $\Delta t$ and the operation is started again, then the accumulator stores the resultant sum.

For a constant DC error voltage applied, the count stored in an accumulator will increase steadily, eventually filling it.

The integrator must be a bipolar device to be useful. Therefore, the applied voltage is biased with a reference voltage. Resultant voltages higher than the reference are considered positive, and a count "UP" control is dictated. Conversely, lower voltages are negative and produce a "DOWN" control.

This analog-to-digital converter is used to convert phase detector error voltages into a train of pulses which are accumulated to form the required integration.

A second integration is required to provide zero-velocity-error control. This second integrator is purely digital.

Figure 6:
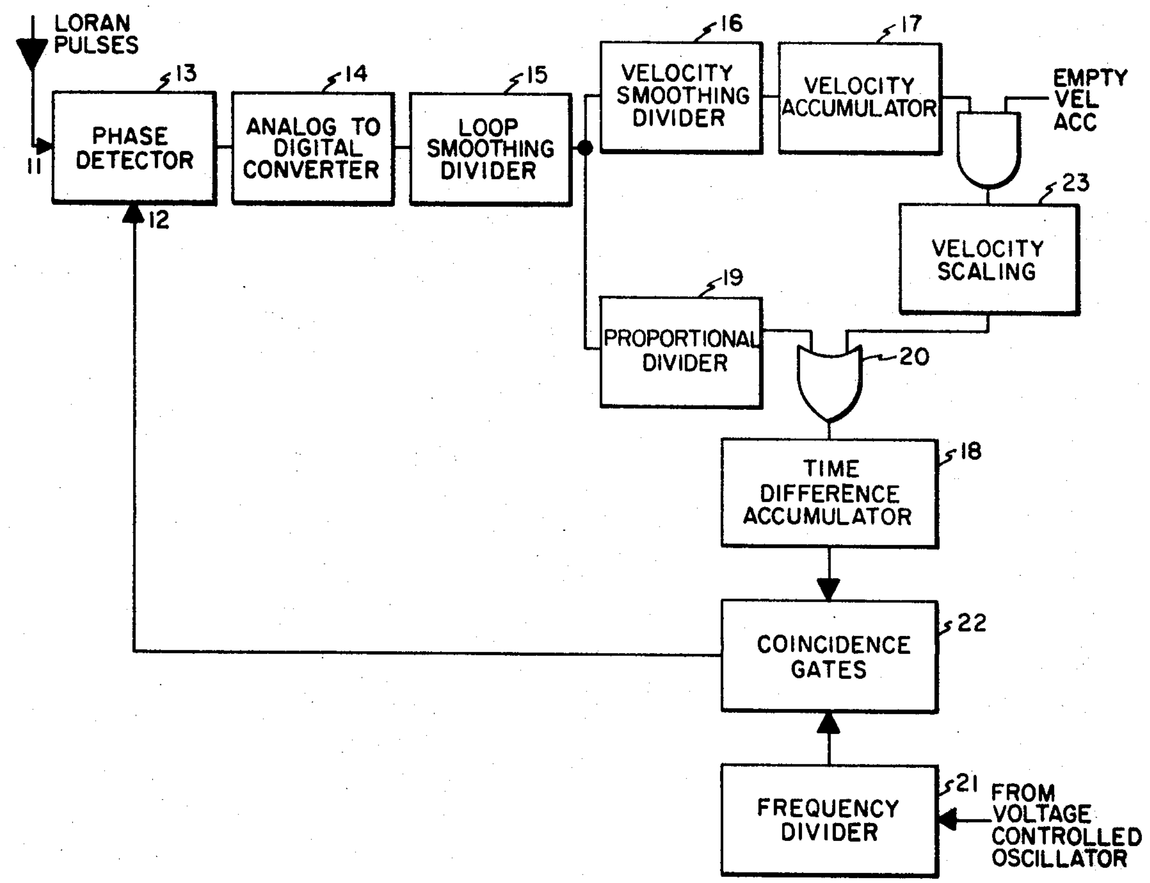
FIG. 6 is a functional block diagram of a tracking loop employing a phase lock loop.

Using the above described building blocks, a zero-velocity-error tracking loop can be formed. One implementation is shown in FIG. 6. The arrangement shown in FIG. 6 is actually a Slave tracking loop.

An error detector 13 (a phase or zero crossover detector in this case) compares the position of a cycle of the received RF pulse applied to input terminal 11 with that of an internally generated strobe pulse applied to input terminal 12. If the strobe is not properly straddling the zero crossover, a DC error is produced with magnitude and polarity proportional to the phase error. The DC voltage is converted to a string of pulses with a sign assigned, and the number porportional to the error. If the error persists, the string of pulses will be repeated at fixed intervals; in the case of the Loran receiver, the Loran repetition interval. The output of phase detector 13 is applied to analog-to-digital converter 14 which produces a train of pulses which feed the loop smoothing divider 15 which contains the above-mentioned binary UP/DOWN counter. Eventually, the counter will overflow. The spill-over is passed into two paths, the integral path containing the velocity accumulator comprising velocity smoothing divider 16 and velocity accumulator 17, and the proportional path leading to time difference accumulator 18 via proportional divider 19 and gating 20. The output of a voltage controlled oscillator, controlled by the Master tracking loop, is applied to frequency divider 21 which feeds coincidence gates 22. The output of time difference accumulator 18 and the frequency divider 21 are applied to coincidence gates 22 for producing the strobe pulses which is applied to phase detector 13 via terminal 12. The time difference accumulator 18 controls the time delay of the strobe pulses with respect to the Master Loran pulse. As stated above, the strobe pulse is then fed back to the phase detector, closing the loop.

As spill-overs from the counter pass through the proportional path and into time difference accumulator 18, the error is proportionally reduced, reducing the number of pulses in the counter. This part of the loop is identical to conventional proportional error servo mechanisms.

The error pulses are also filling the velocity accumulator 17 by way of velocity smoothing counter 16. At each Loran interval, the stored count in this accumulator is emptied as previously described in the digital integrator. The system may include a glass delay line memory which stores the velocity data of the accumulator temporarily while it is being emptied. The accumulated count is returned to the register before new error pulses are generated in the analog-to-digital converter. The velocity pulses pass through scaling counter 23 before reaching time difference accumulator 18. Overflow of scaling counter 23 will, therefore, modify the time delay at a regular rate, proportional to the state of the velocity accumulated. This action comprises the second integrator described above.

When tracking a constant vehicle motion, a digital count proportional to the velocity will be stored in the velocity accumulator 17. The time delay will be updated by as many microseconds per second as are required to follow the motion. In this manner, no error voltages from the phase detector are required to retain exact synchronism with the moving Loran pulses. A more complete and detailed description can be found in the above cited reference.

Figure 7:
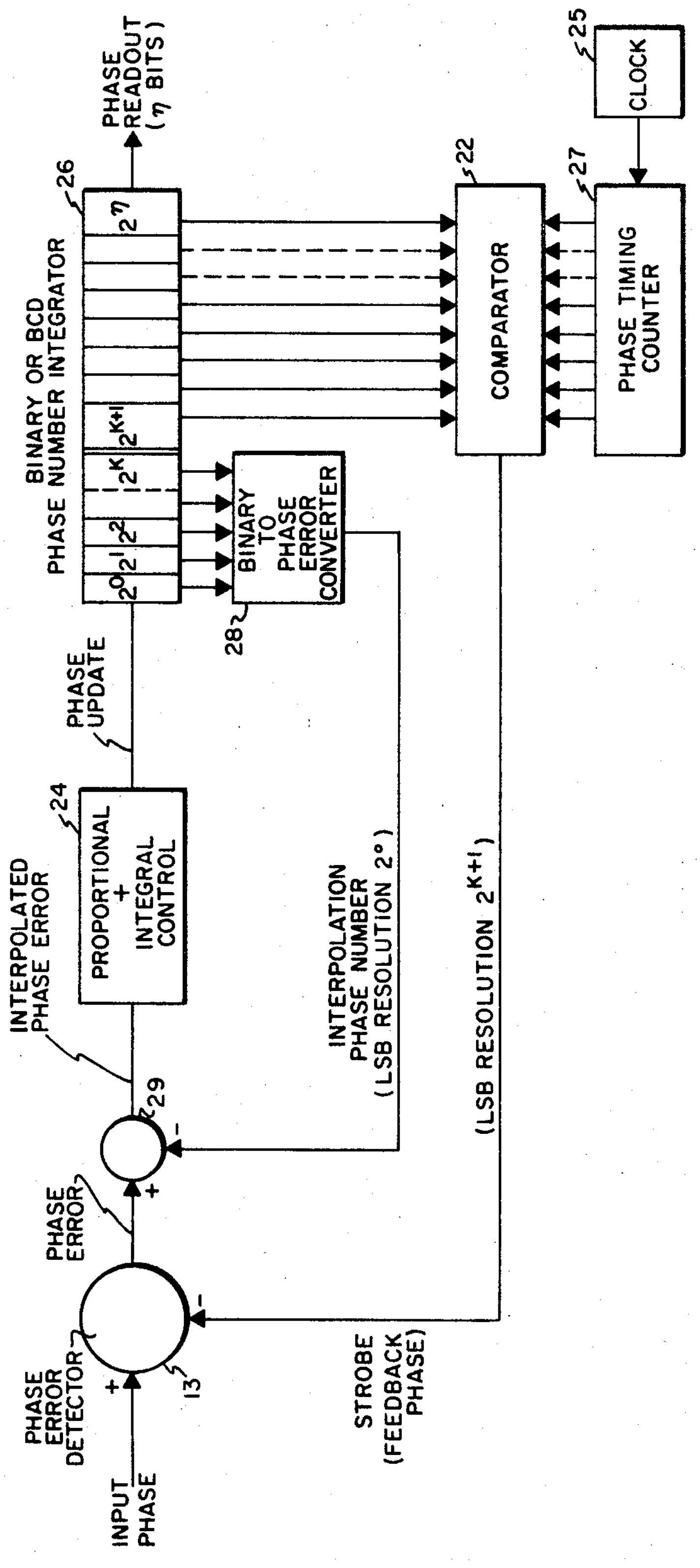
FIG. 7 is a functional diagram of a low resolution digital phase-lock loop embodying the inventive technique.

Referring to FIG. 7, which represents a low resolution digital phase lock loop embodying the inventive technique, proportional plus integral control unit 24 has the same function as analog-to-digital converter 14, loop smoothing divider 15, velocity smoothing divider 16, velocity accumulator 17, velocity scaling 23, proportional divider 19 and gating 20 in FIG. 6. Clock 25 controls phase timing counter 26 in much the same way as frequency divider 21 of FIG. 6 is controlled by the output of a voltage controlled oscillator. Phase number integrator 26 corresponds to the time difference accumulator 18 of FIG. 6 but is shown in much more detail, i.e. all *n* bits are shown.

Referring to FIG. 7, a phase error is detected in phase error detector 13, the resolution of which can be made as high as desired by a variety of known techniques. One straight-forward technique is the use of a high amplitude input signal to increase error sensitivity followed by a high resolution (perhaps 12 bit) analog-to-digital converter. The detected error is smoothed in proportional plus integral control unit 24 and is allowed to update the phase number integrator 26 which has a total of *n* bits. The bits in phase number integrator 26 numbered $k+1$ and above control the phase of the feedback strobe pulse in the same manner as did the output of coincident gates 22 in FIG. 6. In this manner a coarse resolution is achieved. Bits O through *k* are the fine resolution bits which do not control the feedback phase of the strobe pulse but do make up the high accuracy portion of the number contained in phase number integrator 26. The number corresponding to these lower order bits is converted to an equivalent phase error in binary to phase error converter 28 and fed back and subtracted from the phase error in combiner 29, the output of which then represents an interpolated phase error.

The conversion performed in binary to phase error converter 28 may be a simple linear scaling or may be a sinusoidal transformation, or any other mathematical function depending on the phase error detection transfer function. The accuracy of the phase read-out depends on how closely the conversion matches the phase detector error function. If the desired amount of interpolation $\Delta \phi$ is small such that $\sin\Delta\phi \approx \Delta\phi$, then the linear scaling is sufficient. In the steady state, the interpolation phase number which is output from binary to phase error converter 28 will equal the phase error, and the interpolated phase error will be zero. Phase number integrator 26 will then hold an accurate, full resolution number of length *n* bits.

It is to be understood that the foregoing description of specific examples of this invention is made by way of example only and is not to be considered as a limitation on its scope.

I claim:

1. An improved method of reducing the accuracy resolution of a phase lock-loop of the type wherein the phase error of an input signal with respect to an internally generated strobe pulse is detected, smoothed and updates a phase number accumulator, and wherein the value contained in said phase number accumulator is compared with a value in a timing counter driven by a local clock to control the position of said internally generated strobe pulse, wherein the improvement comprises:

storing said accumulated phase error in a digital accumulator having *n* bits;

comparing a predetermined number of higher order bits with said timing counter to produce said strobe pulse and sample said phase error;

converting the value of the remaining lower order bits in said accumulator to an equivalent phase error; and subtracting said equivalent phase error from the phase error of said input signal with respect to said strobe pulse.

2. A method according to claim 1 wherein said conversion corresponds to a linear scaling.

3. A method according to claim 1 wherein said conversion corresponds to a sinusoidal transformation.

4. An improved low resolution digital phase lock-loop for use in a digital sampled data system of the type wherein there is provided a phase error detector for measuring the phase error of an input signal with respect to an internally generated strobe pulse, means for smoothing and digitizing said phase error, means for accumulating said phase error, means for comparing the value of said accumulated phase error with the value contained in a timing counter driven by a local clock to control the position of said internally generated strobe pulse, wherein the improvement comprises:

a digital accumulator for storing said accumulated phase error having *n* bits;

means for comparing a predetermined number of higher order bits with said timing counter to control the position of said strobe pulse;

means for converting the remaining lower order bits to said accumulator to an equivalent phase error; and means for subtracting said equivalent phase error from the phase error of said input signal with respect to said strobe pulse.

* * * * *